United States Patent [19]
Detampel, Jr. et al.

[11] Patent Number: 5,995,608
[45] Date of Patent: Nov. 30, 1999

[54] METHOD AND APPARATUS FOR ON-DEMAND TELECONFERENCING

[75] Inventors: Donald Francis Detampel, Jr., Westminster; Ronald D. Phillips, Golden; Thomas Edward Yackey, Jr., Broomfield, all of Colo.; Gregory Wayne Selig, Greenbay, Wis.; Eric Jay Nylander, Morrison; Kevin Dale Barnes, Thornton, both of Colo.

[73] Assignee: Confertech Systems Inc., Westminster, Colo.

[21] Appl. No.: 08/825,477
[22] Filed: Mar. 28, 1997
[51] Int. Cl.⁶ .............................. H04M 3/56; H04M 7/00
[52] U.S. Cl. ........................ 379/205; 370/261; 379/204; 379/207; 379/230
[58] Field of Search ...................................... 370/260, 261, 370/262; 348/7, 13, 14, 15; 379/202, 203, 204, 205, 206, 207, 230

[56] References Cited

U.S. PATENT DOCUMENTS

| | | | |
|---|---|---|---|
| 4,475,189 | 10/1984 | Herr et al. | 370/261 |
| 4,529,842 | 7/1985 | Levy et al. | 379/202 |
| 4,540,850 | 9/1985 | Herr et al. | 379/88.19 |
| 4,945,534 | 7/1990 | Driscoll et al. | 370/260 |
| 4,953,159 | 8/1990 | Hayden et al. | 370/265 |
| 5,210,794 | 5/1993 | Brunsgard | 380/9 |
| 5,369,694 | 11/1994 | Bales et al. | 379/206 |
| 5,384,840 | 1/1995 | Blatchford et al. | 379/229 |
| 5,408,518 | 4/1995 | Yunoki | 379/67.1 |
| 5,475,747 | 12/1995 | Bales et al. | 379/201 |
| 5,483,588 | 1/1996 | Easton et al. | 379/202 |
| 5,495,522 | 2/1996 | Allen et al. | 379/202 |
| 5,526,413 | 6/1996 | Cheston, III et al. | 379/201 |
| 5,535,200 | 7/1996 | Gardner | 370/410 |
| 5,544,237 | 8/1996 | Bales et al. | 379/205 |
| 5,559,875 | 9/1996 | Bieselin et al. | 379/202 |
| 5,559,876 | 9/1996 | Alperovich | 379/205 |
| 5,583,925 | 12/1996 | Bernstein | 379/202 |
| 5,590,127 | 12/1996 | Bales et al. | 370/260 |
| 5,812,652 | 9/1998 | Jodoin et al. | 379/205 |
| 5,812,653 | 9/1998 | Jodoin et al. | 379/205 |

FOREIGN PATENT DOCUMENTS

| | | | |
|---|---|---|---|
| 57-050165 | 3/1982 | Japan | H04M 3/56 |
| 5-103103 | 4/1993 | Japan | H04M 3/56 |
| 6-225055 | 8/1994 | Japan | H04M 3/56 |

*Primary Examiner*—Harry S. Hong
*Attorney, Agent, or Firm*—Dorr, Carson, Sloan & Birney, P.C.

[57] ABSTRACT

An on-demand teleconferencing system and method for setting up an on-demand conference call in a telecommunications system having the Advanced Information Network (AIN) architecture with system signaling the number 7 (SS7) and a Public Switched Telephone Network (PSTN). A subscriber is assigned an on-demand conference call number. When that number is dialed into the PSTN, it is identified by the PSTN that the dialed number requires handling by the SS7. The SS7 links the dialed number to a conference allocation and control system (CACS) which is connected to a plurality of scalable bridge servers. The CACS selects bridge servers available to handle the conference call and based upon a selection criteria such as a peak load sets up the on-demand conference call in one of the selected bridge servers.

29 Claims, 7 Drawing Sheets

METHOD AND APPARATUS FOR ON-DEMAND TELECONFERENCING

FIELD OF THE INVENTION

The present invention pertains to the field of teleconferencing methods and systems and, in particular, to teleconferencing systems using bridge servers.

BACKGROUND OF THE INVENTION

1. Statement of the Problem—Corporations frequently encounter situations where a meeting between geographically separated parties would be appropriate, but the expenses associated with physical travel are prohibitive to that meeting taking place. In this situation, teleconferencing provides a convenient, low-cost solution by allowing individuals from various geographic locations to have a meeting over the telephone. Teleconferencing is also used within companies where parties to a meeting would not necessarily have to travel, but where meeting size exceeds available meeting space, or where gathering all meeting participants in one place is deemed inefficient. Private parties can also make use of teleconferencing for communicating simultaneously with multiple friends or family members over the phone.

In the past, teleconferencing was practiced from within a Private Branch Exchange (PBX) by manually dialing out to connect each participant to the others, with each participant placed on hold until all were connected to the conference originator. The disadvantages of this technique are many, with the most important being the continuing degradation in audio quality as each attendee is added, which often becomes unacceptable beyond three attendees. Additionally, this teleconferencing method is inconvenient and time-consuming.

Successor technology to PBX teleconferencing utilized conferencing bridge systems which used signal processing techniques to improve audio quality by controlling which talkers were summed together and provided to conference attendees as audio output of the bridge system. The primary disadvantage of this system is that the bridge system encompasses a limited number of voice channel resources, or ports, whose utilization must be manually monitored, scheduled, and controlled by an operator. This limitation requires users to schedule conferences in advance by specifying the time, duration, and number of ports required for the conference. What is needed is an automatic conferencing system or service that connects conferees together in teleconferences without a need for prior reservation or operator interaction.

Prior art conferencing bridge systems require that all system components be physically co-located to allow for operator control and system maintenance. This prevents the system from taking advantage of such flexibility and cost-saving techniques as least-cost routing and geographic load management. What is needed is the ability to locate conferencing hardware, specifically bridge resources, across a wide area geographically and still retain overall system control within a central location. In this system, conferences could occur physically on whatever hardware was determined to be the best choice from load-control and routing cost considerations, and the particular bridge selected for a conference would be unimportant and transparent to both conferees and operators.

Current conferencing systems support a limited selection of control interfaces available to conferees, most supporting Dual-Tone Multifrequency (DTMF) and operator controls only. A need exists for a system or service that allows the flexibility of a variety of control interfaces, including DTMF, operator, World Wide Web (WWW), and E-mail. Furthermore, all of the available interfaces should provide status information that is updated automatically whenever a status change takes place as a result of a command entered via one of the interfaces.

Present conferencing bridge systems are limited to supporting a maximum of a few hundred conferencing ports within a single system, which leads to high customer cost when use load of the system becomes high enough to warrant the addition of additional conferencing ports. This typically requires the purchase of an entire new bridge system. What is needed is a system that can be scaled in small port capacity increments from a few hundred up to many thousands of ports, without the need for an entire system purchase at each scaling point.

Prior art conferencing methods are highly prone to faults due to failed or partially-incapacitated hardware resources. For example, a hardware failure in a bridge will likely result in the need for manual intervention by conferencing operators to ensure that new conferences are not started on that bridge. Conferences in progress on that bridge may also be affected by being prematurely terminated. This can also happen upon a failure of central controlling software. What is needed is a system that can dynamically and automatically route new conferences away from failed hardware resources, as well as allow conferences in progress to continue despite a failure within the control system.

The following patents minimize the use of an operator in setting up a conference call. U.S. Pat. No. 5,559,876 to Alperovich provides a conferencing feature wherein an initiating subscriber creates a list of directory numbers for participants in a memory along with a conferencing code. The initiating subscriber must actually enter in the directory number of each participant for storage in the memory. To establish a conference call, the initiating subscriber enters the conference code. Conferencing circuitry detects the conferencing code and automatically conferences together participants associated with the directory numbers in memory. The '876 patent requires the initiating subscriber to enter the names and numbers of participants in advance of the conference call.

U.S. Pat. No. 5,408,518 issued to Yunoki provides a teleconference sponsor with the ability to reserve a teleconference in advance. The teleconference sponsor inputs data on the date and time of the teleconference run and data on the names of all teleconference participants. The '518 system registers the teleconference and then notifies the teleconference participants, in advance of the teleconference, by means such as a recorded message setting forth the date and time of the teleconference. Hence, the '518 patent requires reservation of a teleconference by the subscriber and then a separate process for notifying the teleconference participants prior to the time for the teleconference. The '518 system then calls up the respective teleconference participants registered in the database.

U.S. Pat. No. 5,483,588 issued to Eaton, et al., like the '518 and '876 patents set forth above, minimizes the need for a human operator to perform teleconferencing tasks. A user dials a "profile access" number, which permits the user to schedule a conference, select a conference to attend, manage recorded voice segments, and perform basic administrative functions such as changing their password. After the user has entered a correct profile and password access, the user can schedule a conference. If the user wishes to schedule a conference call in the future, the user enters the date, time, length and number of attendees. The system determines whether or not sufficient resources are available at that date and time with that length and number of attendees to schedule the call. If not enough resources are available, the user is asked to reschedule the conference call. Otherwise, the system prompts the caller for the conference call name and the agenda for the conference call. The system provides an ID number. If the user wants an immediate conference, the system performs the same steps to determine availability of resources. Attendees to the conference can then call in and input the ID. If the ID is proper, the attendee is added to the conference call.

U.S. Pat. No. 5,559,875 issued to Bieselin, et al. sets forth a method and apparatus for recording and retrieval of audio conferences. The audio portion of the conference is recorded and digitized and placed in blocks of a determined size. These blocks are then stored on a computer storage medium so that they can be located and played back later.

None of the above patents solve the needs set forth above.

2. Solution to the Problem—The present invention solves the above problems by providing a novel system and method in the way that conferencing bridge resources are managed and dynamically allocated to process conference calls using scalable bridge(s) with real time resources.

SUMMARY OF THE INVENTION

The requirements for prior scheduling and operator interaction imposed by the prior art approaches are eliminated, thus providing conference attendees with a completely automated interface with the bridge system.

This present invention makes use of the Advanced Information Network (AIN) architecture currently in place in the North American telephone network. Specifically, Signaling System 7 (SS7) out-of-band signaling is utilized to dynamically route incoming conference calls to bridges with available resources, which may be in geographically diverse locations within a single conferencing system. This approach allows for least-cost routing and therefore reduced network costs for subscribers, as well as virtually unlimited system scalability. Additionally, dynamic call routing allows for system redundancy and fault-tolerance, since calls can easily and automatically be routed away from a failed bridge resource to a functioning one.

Each subscriber to the conferencing service of the present invention is given a telephone number for connecting to the conferencing system, along with a system passcode and a maximum conference size at the time he or she signs up for the service. In order to have a conference, the subscriber distributes his or her telephone number to the conference participants, along with a PIN code of the subscriber's choosing. The conference is initiated when the subscriber dials in to the system, enters the subscriber passcode, and enters the conference PIN. Attendees then dial into the conference using the subscriber's phone number, enter the subscriber-supplied PIN, and are connected to the conference. Facilities for operator interaction with conference participants are provided, but are designed to be necessary only in a small fraction of conferences; for example when a subscriber forgets a passcode or when operator assistance is specifically requested by a conference subscriber or participant. Conferees are further provided with a variety of interfaces to the system for entering status changes by means of DTMF signals, WWW (internet) commands and/or E-mail, and viewing status information about their conference.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

1. Overview—In the following description, for purposes of explanation, numerous specific details are set forth in order to provide a thorough understanding of the present invention. It is important to understand that the present invention may be practiced with some or all of these specific details. Conventional hardware and systems are shown in block diagram form and process steps are shown in flowcharts. Furthermore, it is readily apparent to one skilled in the art that the specific processes in which system and method details are presented and functions are performed set forth the preferred embodiment and such processes can be varied and still remain within the spirit and scope of the present invention. The system described herein utilizes a dial-in plan where each subscriber has a unique telephone number that is used to access the conferencing system, but it is further contemplated that the system could be implemented with a single dial-in number for use by all conference participants, and still remain within the spirit and scope of the present invention.

Figure 1:
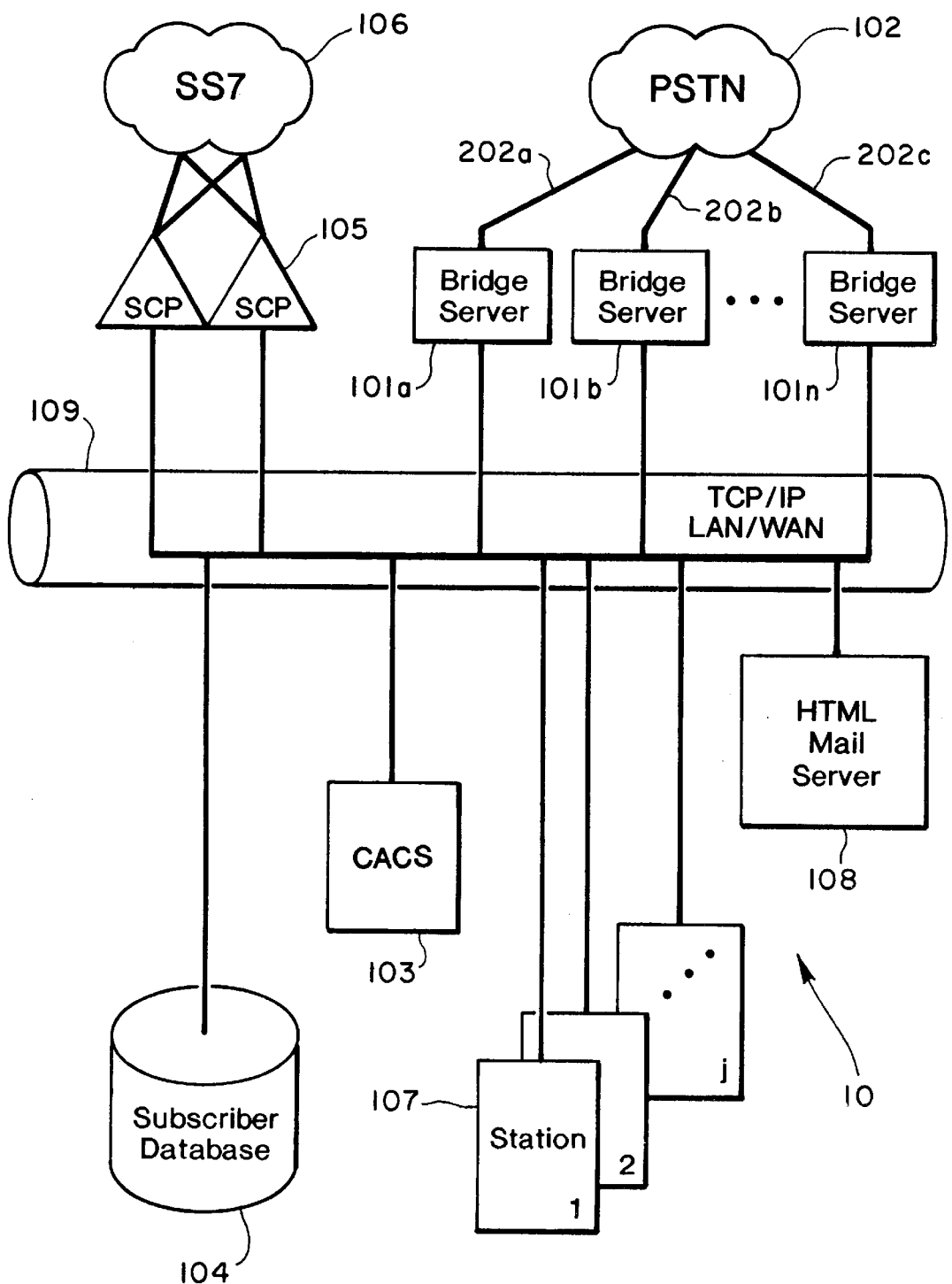
FIG. 1 is a block overview of one embodiment of the present invention, including telecommunication system connections.

2. On-Demand Conferencing System 10—FIG. 1 shows a block diagram of a system embodiment 10 that will accomplish the scope of the present invention. The conferencing system consists of a plurality of bridge servers 101 that physically connect to the conventional Public Switched Telephone Network (PSTN) 102 and provide digital signal processing, conferencing, call flow, and other conference-related functionality.

The bridge servers 101 can be of any suitable number (i.e., 101a, 101b, . . . 101n) and can physically be located at any geographic location. For example, the bridge servers can number twenty with each bridge server 101 having as many as 600 ports. Each bridge server 101 is connected to the PSTN 102 via a conventional telecommunications channels 202.

Figure 4:
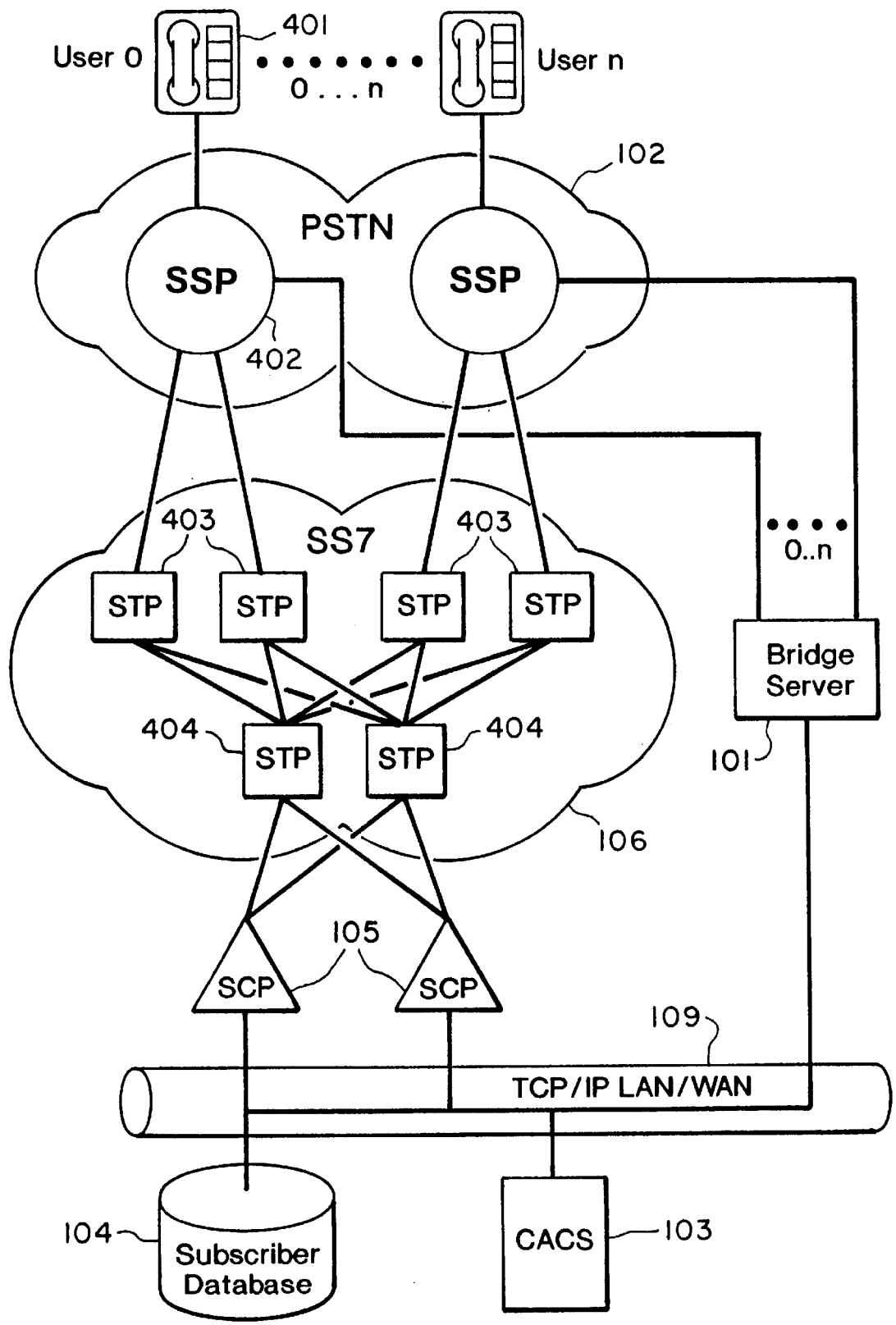
FIG. 4 details the process involved in establishing a voice connection between conferees via a bridge server.

The bridge servers 101 are managed and controlled by the Conference Allocation and Control System (CACS) 103, which is implemented as software residing on a workstation or other processing platform. The CACS 103 is connected to a subscriber database 104 over network 109. The conventional Service Control Point (SCP) hardware pair 105 is physically connected to STP pair 404 within the SS7 network 106 (See FIG. 4), and handles SS7 translation number queries, thereby directing incoming calls to a specific bridge server 101 resource with sufficient available ports to service the on-demand conference. One or a plurality of PC operator/maintenance stations 107 may be connected to the CACS 103 over network 109 to provide operator interaction with the system 10. The plurality of stations 107 can be of any number (i.e., 1–j). The system 10 also includes an HTML/mail server 108 to support WWW and E-mail user interfaces over the network 109. All system components are linked together via TCP/IP Local Area Network (LAN) or Wide Area Network (WAN) 109 that allow intercommunication of commands and data among the various system components. TCP/IP is an acronym for Transmission Control Protocol, Internet Protocol and is a collection of conventionally available protocols for use on network 109.

Under the teachings of the present invention, the CACS 103 (unlike conventional designs where the CACS is integral to a single bridge server 101), the CACS 103 of the present invention connects to a plurality of bridge servers 101*a*–101*n* over the LAN/WVAN 109. This is an important feature of the present invention in that it provides scalability and dynamic allocation. Scalability is achieved wherein a single bridge server 101 can have its existing ports expanded by adding new port cards to the bridge, (for example: expanding from 400 to 600 ports). Scalability also includes the addition of bridge server(s), such as bridge server 101*n* in FIG. 1. The CACS 103 increases the number of bridges and the number of bridge ports available in a bridge status table that is stored in memory of the CACS 103. Unlike conventional bridge servers each having its own CACS, the topological configuration of FIG. 1 allows the bridge servers 101 to increase in the number of ports and to have additional bridge servers added all under a single CACS control 103.

The system 10 of the present invention also provides dynamic allocation of the bridge resources available. By having a single CACS 103 controlling all bridge servers 101*a*–101*n*, the available capacity of each bridge is immediately known by the CACS 103. This is stored in the bridge status table, which will be discussed in greater detail subsequently. However, when an on-demand conference call request comes in, the CACS 103 determines which bridge servers 101 have sufficient availability of ports to handle the on-demand conference call. This may result in the utilization of one or a number of available bridges. If more than one bridge server 101 is available, the system 10 of the present invention determines, as will be explained later, which of the available bridge servers will be selected to service the conference call. If no bridge servers 101 are available, the on-demand conference caller is informed of the status and requested to call later.

It is to be expressly understood that the various subsystems and hardware components of system 10 of the present invention are well known and conventionally available.

Figure 2:
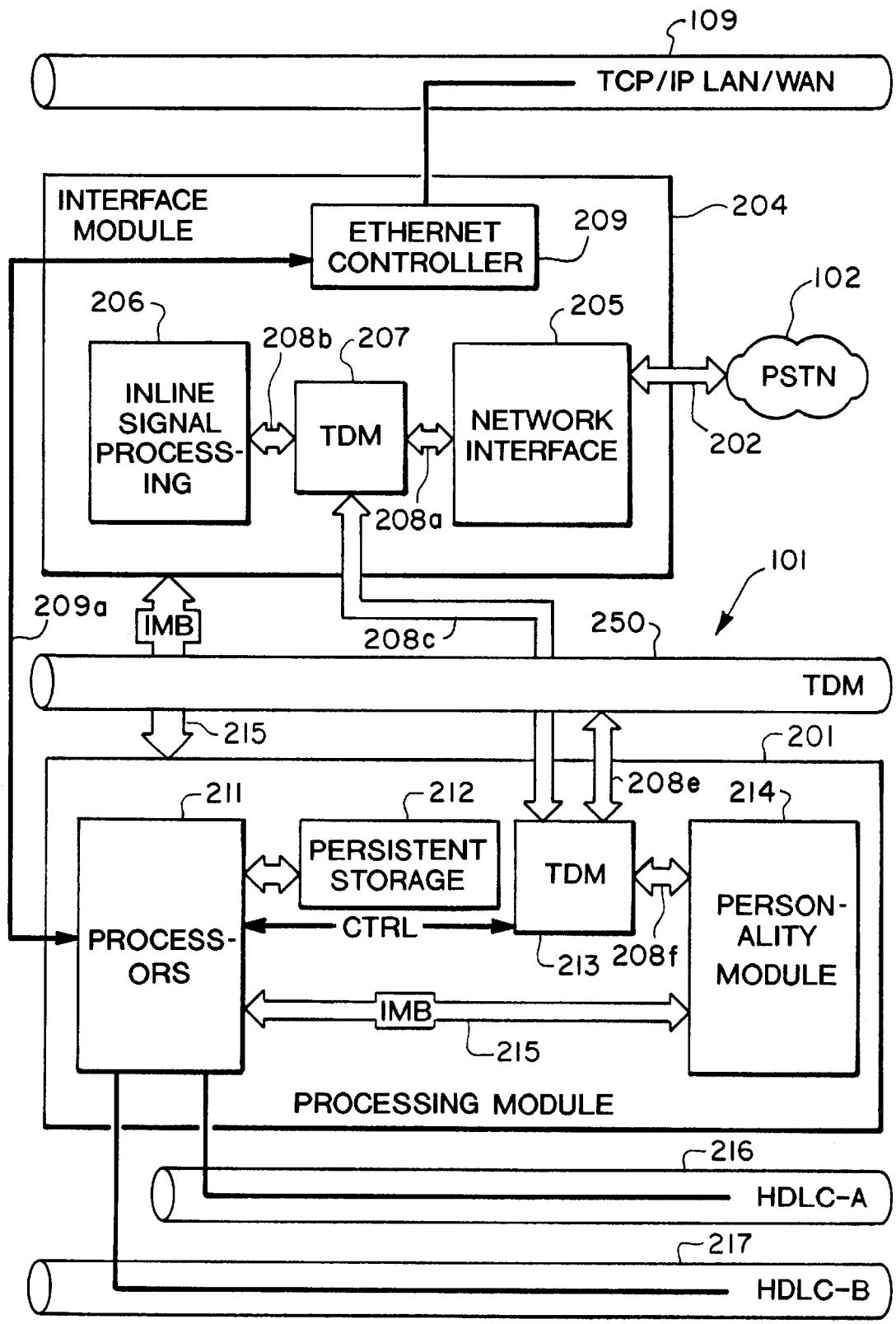
FIG. 2 is a bridge server hardware block diagram.

3. Bridge Server 101—One possible hardware embodiment of a bridge server 101 is shown in FIG. 2. It is contemplated that other forms of bridge hardware could be utilized within the conferencing system and remain within the spirit and scope of this present invention.

A bridge server 101 is composed of one or more processing modules 201 capable of managing and manipulating the channels 202 which connect it to the PSTN 102 via an interface module 204. The interface module 204 is composed of a network interface 205 interconnected to inline signal processing resources 206 through a time division multiplex (TDM) switching matrix 207. The inline signal processing 206 can be used to process (e.g., formatting and protocol changes) the data stream 208*b* before presenting it to the processing module 201 over bus 208*c*, or prior to sending it back to the PSTN 102 over bus 208*a*, depending on whether the data stream is inbound or outbound. The data stream is delivered between the network interface 205 and the TDM 207 over link 208*a*, between TDM 207 and inline signal processor 206 over link 208*b*, between TDM 207 and the processing module 201 over link 208*c*. Additionally, the interface module 204 provides an ethernet controller 209 in order to control the bridge server 101 from across the TCP/IP LAN/WAN 109. The controller 209 is connected over bus 209*a* to the processors 211.

The TDM channel 250 is a backplane connection to other interface modules 204 and communicates with TDM 213 over bus 208*e*.

The processing module 201 is composed of processors 211 that comprise a microprocessor complex which manages and controls the interactions of the data streams within the system. The processors 211 have access to a block of persistent storage 212, which can be used to store state information and other data necessary for the specific application—i.e., existing on-demand conference calls. The processors 211 control the flow of the telephony data stream (generally referred to as 208) through the use of a collocated TDM 213. The personality module 214 is composed of a set of digital signal processing (DSP) resources which manipulate the incoming data streams 208 to provide such functionality as conferencing, DTMF detection, voice prompting, etc. The processors 211 manage the devices in the processing module 201 and interface module 204 through an inter-module bus (IMB) 215. A localized control path is provided for host module to host module communication via an HDLC-A bus 216. Since interoperability between host modules is key to the bridge server operation, a secondary control path is provided through a backup HDLC-B bus 217.

The design of the hardware configuration for a conferencing bridge server 101 is conventional. Other hardware embodiments other than that shown in FIG. 2 could be utilized under the teachings of the present invention.

Figure 3:
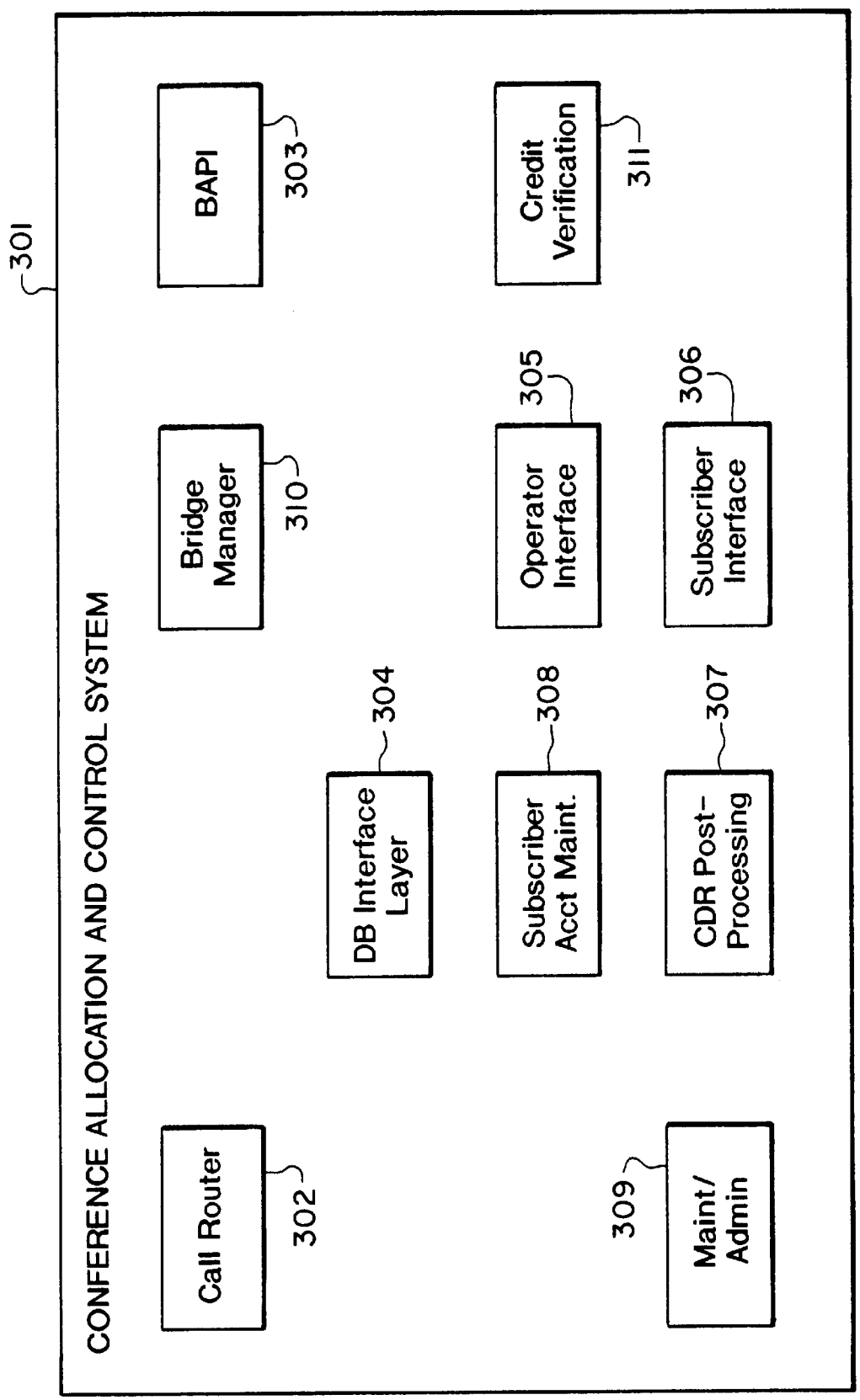
FIG. 3 is a software architecture diagram of the Conference Allocation and Control System (CACS)

4. CACS Software—The CACS software 301 shown in FIG. 3 is a collection of software processing modules and interfaces that run on a workstation or other processing platform 103.

The Call Router module 302 handles SCP pair 105 communication, bridge resource allocation, and maintains a mapping of the dialed number to bridge translation number for conferences in progress. It also maintains a local cache of subscriber access numbers and their associated conference size. This cached information allows the router to meet SS7 106 query response time requirements without depending on the access time of the subscriber database 104.

The Bridge Application Program Interface (BAPI) module 303 handles all communication between the various CACS processes and the bridge servers 101 in the system 10.

The Database Interface Layer module 304 makes all subscriber database 104 queries and routes data to other processes that request it. This process provides a level of shielding between the subscriber database 104 and the various other processes that utilize the data.

The Operator Interface module 305 is the application program interface to the operator/maintenance stations 107, and handles operator request queue management, registration for operator-monitored bridge events, and operator updates to the subscriber database 104.

The Subscriber Interface module 306 is an application programs interface to the conference control features available to the subscriber.

The CDR post-processing module 307 is a process that performs billing and rating functions by processing information from the Call Detail Record (CDR) and may be resident on the CACS workstation 103 or on a separate processing platform (not shown).

The Subscriber Account Maintenance module 308 conveys subscriber account data back and forth between the Operator Interface 305 and the Database Interface Layer 304 whenever this data is viewed or changed by an operator.

The Maintenance/Administration module 309 handles the interface with system-wide maintenance processes and generates appropriate commands and communications as necessary to accomplish a variety of CACS and bridge maintenance functions.

The Bridge Manager module 310 is a coordinated access point for all bridge status and control messages within the CACS 103. It maintains a mapping of subscriber ID to access number to bridge translation numbers for active conferences that enables queries of the subscriber database 104, which is keyed on subscriber ID. It also maintains mappings of bridge channel handles to CACS channel ID's and bridge conference handles to CACS conference ID's. It maintains a list of all available bridges, a list of active conferences (with subscriber information), and participant lists for active conferences. The state of operational bridges is stored in a bridge status table, which contains at least the following information:

BRIDGE ID (Field): NUMBER OF AVAILABLE PORTS (Field)

The CACS 103 maintains this table of all bridge servers 101a–101n. This table provides scalability since it is easy to add more ports to a single bridge server or to add an entire new bridge server simply by adding more entries in the table. This can be done, for example, upon system startup so that the CACS 103 always knows the current status of all bridge servers 101a–101n. It could also be determined on a periodic polling basis to continually update this information in the bridge status table, above. It can also be accomplished whenever changes or modifications to a bridge server 101a–101n are made. This can be on an interrupt basis or on an install or maintenance basis. With respect to maintenance, should any bridge in its entirety or any portion of a bridge server 101 fail, then the bridge status table can be easily modified to delete references to those ports or those bridge servers that have failed. In addition, the bridge status table also enables dynamic allocation of available ports, which are identified in each bridge server.

The Credit Verification module 311 is either an internal process that queries the subscriber database 104 to verify credit for the subscriber's account, or an application program interface to an external credit verification device that makes an external query.

Many of the functions of the software modules in FIG. 3 are conventional. Those functions that are unique under the teachings of the present invention are discussed later.

5. Call Signaling and Conference Setup—The creation, processing, and termination of an on-demand conference are described with reference to FIG. 4. A subscriber for the on-demand conferencing service of the present invention is assigned a number and is provided an initial passcode by the system. The subscriber chooses a maximum conference size from several options such as 10, 15, or 20 and provides other information such as, but not limited to, billing address, credit card number, e-mail address, etc. This information is stored in the subscriber database 104. The number assigned is a unique number identifiable by the PSTN 102 as requiring handling by the SS7 106. This subscriber information can be implemented in several ways. An operator takes subscriber information over the phone, sets up an account, and initiates service. This subscriber information may also be E-mailed or the subscriber can fill out an Internet form. The system processes the Internet form and returns a document to the subscriber on the Internet, in real time, including the subscriber's unique on-demand conference phone number and initial passcode. All of the subscriber information is loaded into the subscriber database.

In the preferred embodiment, the database 104 has fields for account entry date, subscriber ID, account ID, home, address, phone and fax numbers, E-mail address, on-demand phone number, passcode and account status (active or inactive) as well as other conventional subscriber account management and information fields.

The sequence begins when the telephone user (User 0) 401 dials the unique number such as an N00 (800/888) number with the subscriber who is sponsoring the conference. User 401 need not, but may be, the subscriber of the conferencing service. The call is connected to User 0's PSTN Service Switching Point (SSP) 402, which identifies the called number as requiring handling by the SS7 network 106 and makes an SS7 TCAP routing request query of that SS7 network's Signal Transfer Point (STP) pair 403a. The TCAP query requests routing instructions. The SS7 routing request is linked to the STP pair 404 that is linked to the On-Demand SCP pair 105. The SCP pair 105 has a unique point code (address) associated with it to facilitate routing. The CACS call router module 302 receives a routing request from over network 109 from the SCP pair 105. The CACS 103 selects a bridge server 101 with enough available capacity to handle the maximum number of conference participants allowed by the service (e.g., 20), allocates the capacity, and returns routing instructions in terms of a POTS or ONNET translation number through the SCP pair 105. Each bridge server 101 would have a unique POTS or ONNET translation number for every simultaneous conference allowed on the bridge. For example, if the on-demand service had a maximum participant capacity of 20, each bridge server would need at least 12 (240 ports/20 participants per conference) unique POTS or ONNET translation numbers. The translation numbers between bridge servers 101 would be unique because the translation numbers are used by the long distance carrier to control N00 routing within their network. The CACS 103 also notes that any other routing requests for the same N00 number will receive the same routing instructions until the on-demand conference is de-allocated. Finally, the CACS 103 would note which translation number is currently "assigned" to which N00 number so that a translation number can be tied to the dialed N00 number which can be tied to a participant which can be tied to the currently authorized participant/subscriber passcode. The SCP pair 105 encapsulates the routing instructions with an SS7 TCAP message and returns appropriate routing instructions via the SS7 network 106 to the originating service point 402. The on-demand call is routed via the PSTN 102 to the selected bridge server 101.

The dialing of the unique number into the PSTN, the routing of the number to SS7 106 and the identification of the number as requiring special handling by the SS7 106 are conventional. The assigning of such a number for on-demand conferencing is unique to the present invention.

a. Selection of Bridge

Figure 5:
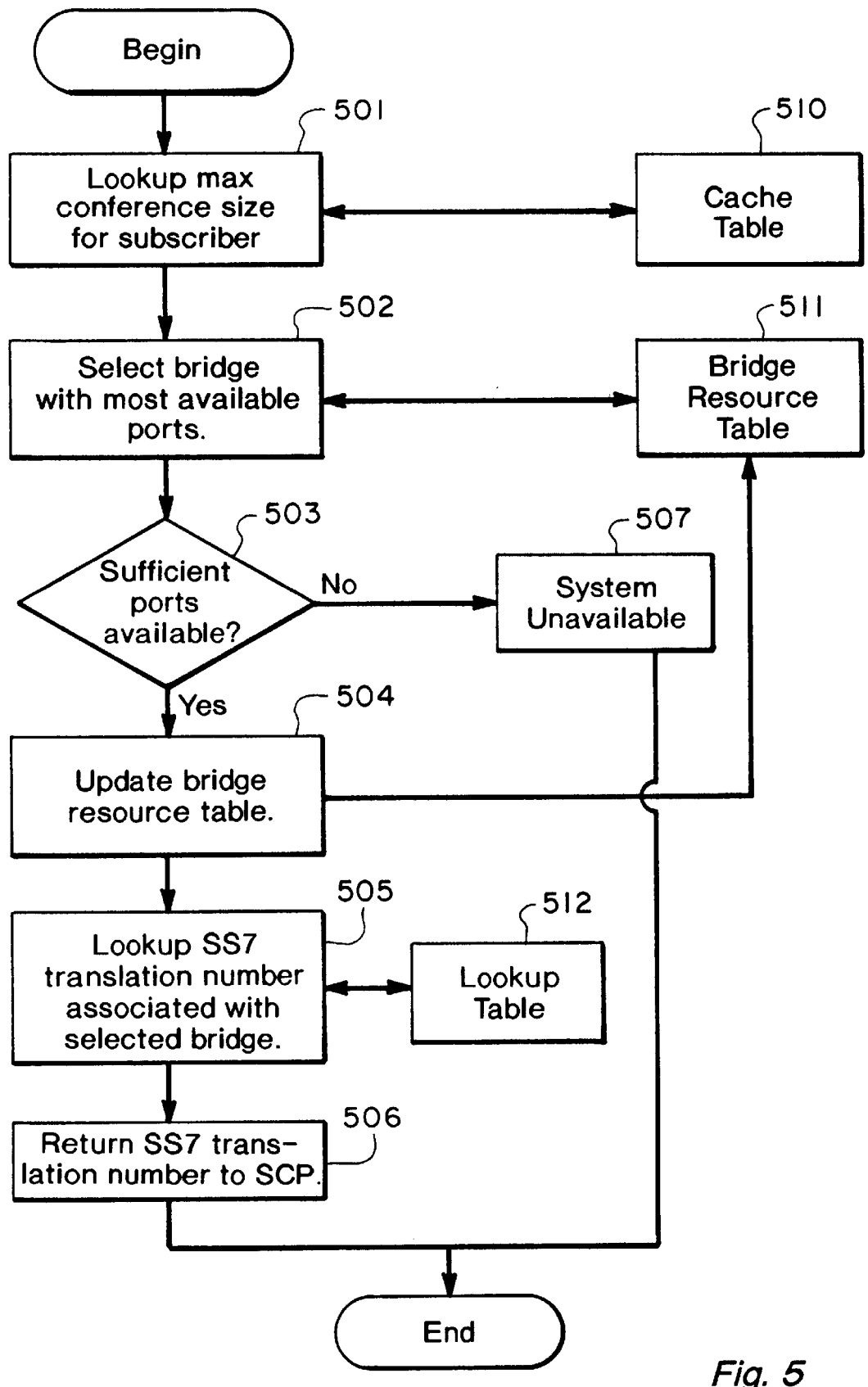
FIG. 5 is a flow chart describing the process by which the call router within the CACS selects a bridge server to host a new conference.

The decision of which bridge 101 in FIG. 1 should receive the call can be based on selection criteria that consider availability, load control, least-cost routing and component failure. One embodiment of this decision-making logic is illustrated in FIG. 5. Upon receipt of the routing request from the SCP pair 105, the call router module 302 looks up

501 the maximum permissible conference size associated with the subscriber (who is identified by the called number) in a cached mapping table 510 which is memory available to the Call Router module 302. The Call Router module 302 then selects 502, from its bridge resource table 511, the bridge 101 with the most available conferencing ports. If this bridge has enough available ports to support this new conference 503, then the Call Router module 302 allocates the required number of ports to this conference by updating 504 the bridge resource table which is memory available to the Call Router and Bridge Manager modules.

Finally, the Call Router module 302 obtains 505 a translation number in a lookup table 512 for the selected bridge and returns 506 this number to the SS7 network 106 via the SCP pair 105. If there are not enough conferencing resources available on the selected bridge, then a "system unavailable" message is returned 507 to the SS7 network 106.

The processing stage 503 in the preferred embodiment also includes a step of load management. A number of conventional approaches are available to manage bridge server resources when peak demands are made.

The system 10, after determining which bridge servers have ports available then determines of those which bridge servers are best from a load management determination. A determination is also made in the preferred embodiment as to which bridge server will be least costly to route the call. Again, conventional methods are available for this. And, a determination is also made as to which bridge servers are not in operation or which ports of particular bridge servers have failed hardware resources. Any one or all of these determinations (i.e., load management, least cost routing, and failed hardware resources) could be implemented under the teachings of the present invention.

The Call Router module 302 always contains the available capacity in the bridge status table so that for the next on-demand conferencing request the table will be fully updated with respect to the availability of ports on each bridge server. This feature is an important part of the dynamic allocation of the present invention.

The Call Router module 302 then sends a packet to the bridge manager 310 that maps the dialed number to the translation number that was provided to the SS7 network. The bridge manager 310 will later use this mapping to identify the subscriber that is associated with that particular translation number for use in subscriber database 104 queries. Once the call reaches a bridge server 101, the bridge sends a packet via BAPI 303 and the Bridge Manager module 310 to the Database Interface Layer 304 requesting subscriber information from the database 104, which is returned via the Bridge Manager module 310 and BAPI 303 to the bridge server 101. To accomplish this, the bridge manager 310 must relate the translation number that was supplied by the bridge server 101 to the original dialed number, which is used to identify the subscriber in the database 104. At this point, the bridge server places the call into a call-flow script, one possible embodiment of which is illustrated in FIG. 6.

b. Call Flow

Prior to a conference, the subscriber must choose a PIN for the conference and distribute the PIN and the unique on-demand access number to the participants.

Figure 6:
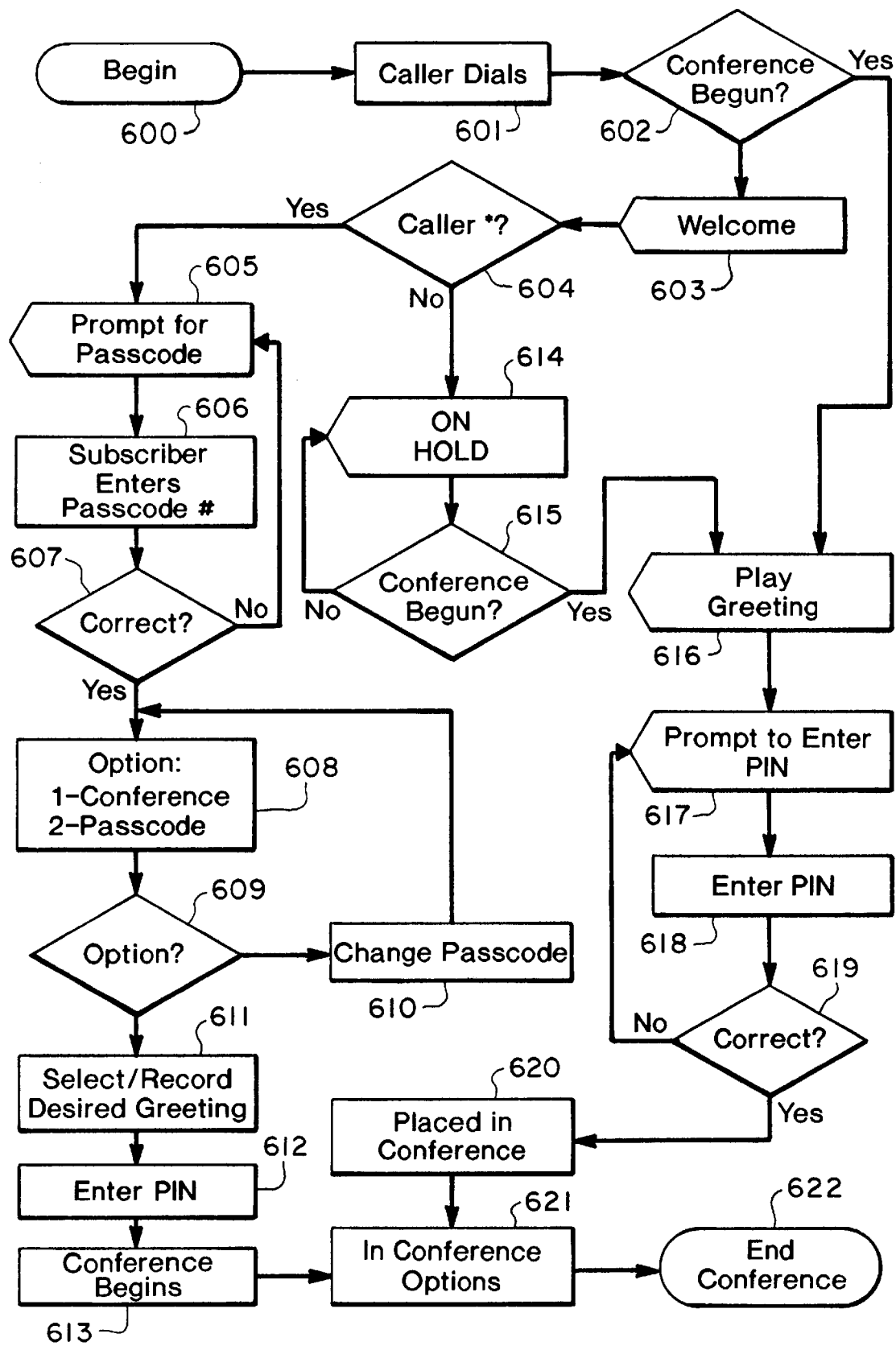
FIG. 6 is a call flow diagram for one embodiment of the conferencing system; and, FIG. 7 details the interfaces available to system users.

In FIG. 6, the on-demand conference begins 600 when the caller dials in the unique on-demand number 601. The steps take place as described above to select the bridge server 101 having enough ports available for the subscriber's maximum call. A decision is made as to whether the conference has begun 602. If not, the system of the present invention plays an initial welcome 603 such as:

"Welcome to on-demand conferencing. Your conference has not yet begun. If you are the subscriber, press the '*' button. If you are a participant, please hold."

When the call flow script detects that the person calling is the subscriber by sensing 604 the pressing of the "*" key, it sends a credit verification request to the credit verification module 311 via BAPI module 303. After some time, the credit verification information is returned to the bridge server 101 via BAPI module 303. During this delay, the call flow script prompts the subscriber to enter his or her subscriber passcode 605.

For example, the passcode entered 606 could be:

79165

Any suitable number of characters could be used under the teachings of the present invention, although the preferred embodiment uses 4 to 10 digits. A decision is made as to whether the passcode is correct 607. If not, then stage 605 is re-entered. If correct, stage 608 is entered. After three incorrect attempts to enter the passcode, the caller is routed (not shown in FIG. 6) to an operator station 107, a wrong passcode recording is played and/or the caller is disconnected.

Upon entry of a valid passcode, the subscriber is given the option 608 to change its passcode or to start a conference. A decision as to which option occurs is made in stage 609. If the passcode is to be changed stage 610 is entered. If the conference option is selected, the subscriber is given the option 611 of recording a custom greeting or using a system default greeting for the conference. The system then prompts the subscriber to enter a conference PIN code, which can be of variable length (including no PIN) 612. For example, the PIN could be:

121

This is when the system of the present invention learns the PIN for the conference.

Once credit has been verified and the conference PIN has been entered, the conference is started 613 on the selected bridge server 101. When this occurs, the selected bridge server 101 sends a conference start packet via BAPI module 303 and the Bridge Manager module 310 to the Operator Interface module 305, which supplies a conference list change message to the operator stations 107 that are registered to monitor changes on this particular bridge 101. After the conference begins 613, stage 621 is entered to monitor for and to provide in conference options discussed later. The system of the present invention has fully set the on-demand conference call up without subscriber reservation or operator control. Even with an operator station 107 assigned, the conference call will be completed without operator intervention provided the subscriber or any participant does not contact the operator.

When an incoming caller to the bridge server 101 is not identified 604 as the subscriber, then they are a participant and are placed on hold 614 until the subscriber has completed recording the greeting 611 and the subscriber has entered the conference PIN 612. Once the conference has started as determined in stage 615, participants are played the subscriber's chosen greeting 616 and prompted to enter the conference PIN 617. The participant then enters the PIN (which in the example above is "121") in stage 618. Upon correct entry 619 of the conference PIN, the caller is added 620 to the conference and enters stage 621. A participant has three tries to enter the PIN successfully and then is disconnected or connected to an operator station (not shown in FIG. 6). As each participant joins the conference, a participant join message is sent via BAPI module 303 and the bridge manager 310 to the operator stations 107 that are monitoring changes on this bridge 101. The join message informs the Bridge Manager module which participant has joined the conference call. The bridge server 101 sends a similar message when participants disconnect or are dropped.

After the subscriber has entered stage 613, any new participants will be immediately directed from stage 602 to stage 616.

The conference ends 622 only when the subscriber disconnects. Participants can disconnect during the conference without terminating the conference (not shown in FIG. 6). At this time, any remaining participants are played a short message and disconnected by the bridge 101, which then sends a conference end message to the Bridge Manager 310 via BAPI 303, which sends the conference end message to the call router module 302 so that bridge resources can be de-allocated. The bridge manager 310 also sends a message to the operator interface 305, which posts the conference list change to the operator stations 107 that are registered to receive changes on this bridge 101. The operator stations 107 then deletes the participant list associated with the just-ended conference.

While a preferred method for call flow has been described, it is to be understood that variations on the above could occur and still be within the teachings of the present invention. For example, other services could be added. In stage 608, the subscriber may select other options such as record the conference, roll call, etc. Also, the order of the flow in FIG. 6 can vary. For example, stages 617, 618, and 619 can occur before stage 616.

c. Subscriber and Participant Control

Figure 7:
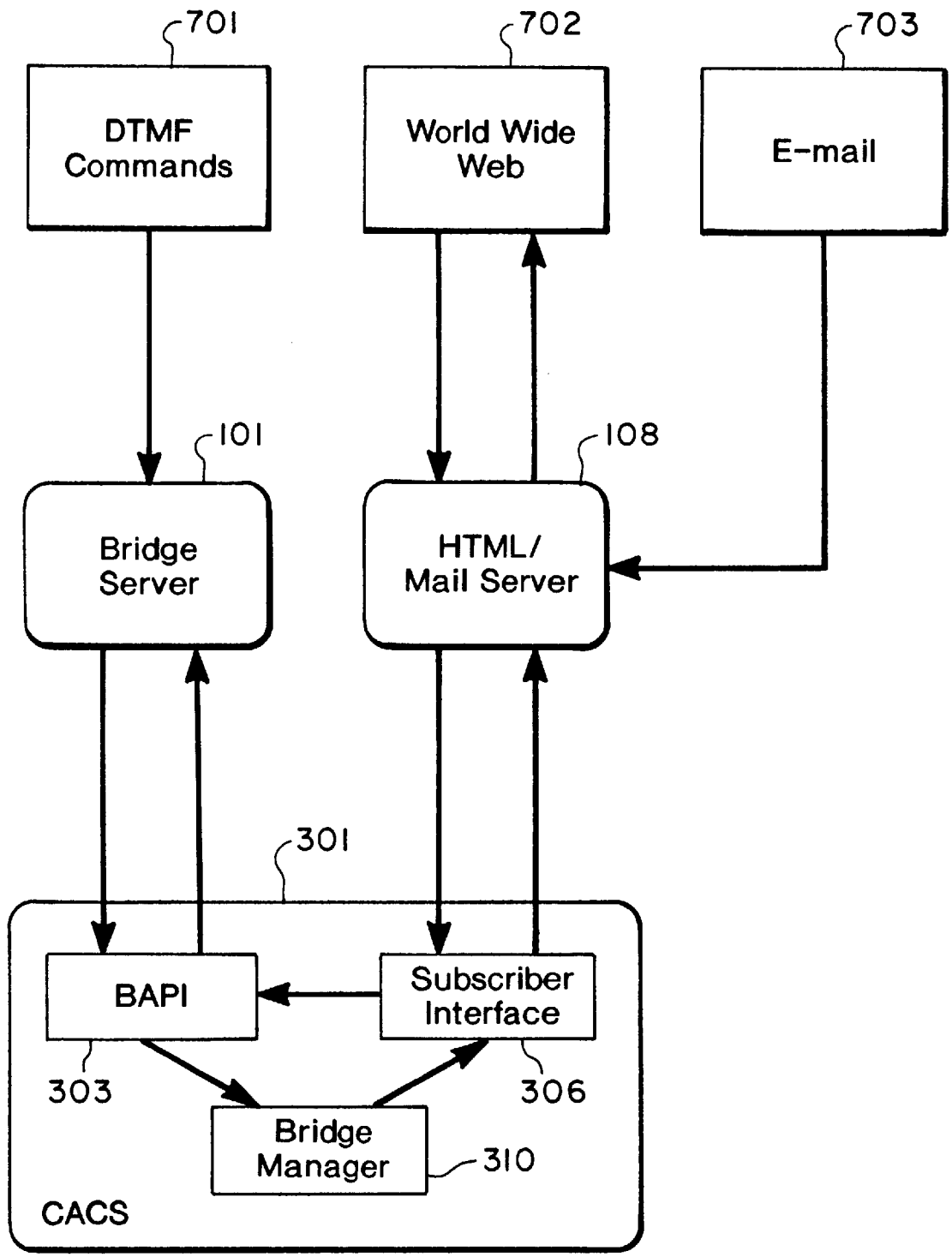

FIG. 7 illustrates the variety of conference control interfaces that are provided to the subscriber and to the conference participants in Stage 621 of FIG. 6. Conferees may enter DTMF commands 701 via their telephone keypad, which are conveyed within the audio channel to the bridge server 101 that is servicing the conference. These commands provide control over several in-conference options, many of which are supported by prior art conferencing systems. In the preferred embodiment, these commands include operator recall, participant count, conference lock/unlock, access to an outside line, and disconnect addressed lines. When a command by a subscriber or participant is entered, the bridge server 101 conveys a conference status change message to the CACS Bridge Manager module 310 via BAPI 303. This status change is passed along to the subscriber interface 306 and then to the HTML/mail server 108, which provides the status change information to any World Wide Web (WWW) 702 users whose browsers may be registered for this information. Subscribers can issue similar commands via the WWW interface 702, which commands are passed to the bridge 101 via the HTML/mail server 108, the subscriber interface 306, and BAPI 303. Non-subscriber participants can view conference status information on a similar WWW 702 interface on which command features (which are restricted to the subscriber) are disabled. Additionally, the system supports electronic mail 703 conference initiation, whereby a specially formatted text message is parsed within the HTML/mail server 108 to extract a conferee list. When this information is received, the subscriber interface 306 instructs the call router 302 to connect the conferees together with the subscriber by initiating the appropriate SS7 routing messages.

The invention has been described with reference to the preferred embodiment. Modifications and alterations will occur to others upon a reading and understanding of this specification. It is intended to include all such modifications and alterations insofar as they come within the scope of the appended claims or the equivalents thereof.

We claim:

1. An on-demand conferencing method for setting up a conference call in a telecommunications system, the telecommunications system having the Advanced Information Network (AIN) architecture with System Signaling 7 (SS7) and a Public Switched Telephone Network (PSTN), the method comprising the steps of:

assigning a unique number for an on-demand conference call to an on-demand subscriber, said assigned unique number identifying a maximum conference size;

dialing the assigned unique number into the PSTN;

identifying in the PSTN that the dialed unique number requires handling by the SS7;

routing the identified unique number through the PSTN to the SS7;

linking in the SS7 the routed unique number to a conference allocation and control system (CACS) connected to a plurality of bridge servers, the CACS and plurality of bridge servers located externally from said PSTN, each of said plurality of bridge servers having a plurality of ports, each of said plurality of bridge servers having a sufficient number of ports to support a plurality of on-demand conference calls;

the CACS selecting available ports on one of said plurality of said bridge servers based on a selection criteria, said selection criteria including at least said maximum conference size for said assigned unique number; and setting up the on-demand conference call through the PSTN on said selected ports on one of the selected bridge servers under control of the CACS.

2. The on-demand conferencing method of claim 1 further comprising the step of changing the status of the set up on-demand conference call when the on-demand user inputs a status change.

3. The on-demand conferencing method of claim 2 wherein the changing status step occurs when the on-demand user inputs at least one of the following: (a) DTMF signals, (b) World Wide Web commands, and (c) E-mail to the CACS.

4. The on-demand conferencing method of claim 1 wherein the step of setting up the on-demand conference call further comprises the steps of:

obtaining a translation number for the selected bridge server in the CACS;

delivering the obtained translation number to the SS7 from the CACS.

5. An on-demand conferencing method for setting up a conference call in a telecommunications system, the telecommunications system having the Advanced Information Network (AIN) architecture with System Signaling 7 (SS7) and a Public Switched Telephone Network (PSTN), the method comprising the steps of:

assigning a unique number for an on-demand conference call to an on-demand subscriber, said assigned unique number identifying the on-demand subscriber and a maximum conference size;

dialing into the PSTN the assigned unique number;

identifying in the PSTN that the dialed unique number requires handling by the SS7;

routing the identified unique number through the PTSN to the SS7;

linking in the SS7 the routed number to a conference allocation and control system (CACS) connected to the plurality of bridge servers, the CACS and the plurality of bridge servers located externally from said PSTN, each of said plurality of bridge servers having a plurality of ports, each of said plurality of bridge servers having a sufficient number of ports to support a plurality of on-demand conference calls;

determining in the CACS the maximum conference size assigned to the linked unique number;

selecting in the CACS available ports on one of said plurality of bridge servers wherein said one bridge server has enough available ports to support the maximum size of the conference call;

reserving in the CACS said available ports on said one of the plurality bridge servers for the conference call; and setting up the on-demand conference call through the PSTN on the one selected bridge server under control of the CACS.

6. The on-demand conferencing method of claim 5 wherein the step of selecting further selects available ports on said one bridge server based on load control and routing costs.

7. The on-demand conferencing method of claim 5 wherein the step of selecting further selects available ports on said one bridge server based upon failed hardware resources in a bridge.

8. The on-demand conferencing method of claim 5 further comprising the step of changing the status of the set up on-demand conference call when the on-demand user inputs a status change.

9. The on-demand conferencing method of claim 8 wherein the changing status step occurs when the on-demand user inputs at least one of the following: (a) DTMF signals, (b) World Wide Web commands, and (c) E-mail to the CACS.

10. The on-demand conferencing method of claim 5 wherein the step of setting up the on-demand conference call further comprises the steps of:

obtaining a translation number for the selected ports on the bridge server in the CACS; and delivering the obtained translation number to the SS7 from the CACS.

11. The on-demand conferencing method of claim 5 wherein the step of selecting further comprises the step of returning a "system unavailable" message when a bridge server cannot be selected.

12. An on-demand conferencing method for setting up a conference call between a subscriber and a plurality of participants in a telecommunications system, the telecommunications system having the Advanced Information Network (AIN) architecture with System Signaling 7 (SS7) and a Public Switched Telephone Network (PSTN), the method comprising the steps of:

assigning a unique number for an on-demand conference call to a subscriber, said assigned unique number identifying the subscriber and the maximum conference size;

dialing by the subscriber or the plurality of participants the assigned unique number into the PSTN;

identifying in the PSTN that the dialed unique number requires handling by the SS7;

routing the identified unique number through the PTSN to the SS7;

linking in the SS7 the routed unique number to a conference allocation and control system (CACS) connected to the plurality of bridge servers, the CACS and the plurality of bridge servers located externally from said PSTN, each of said plurality of bridge servers having a plurality of ports, each of said plurality of bridge servers having a sufficient number of ports to support a plurality of on-demand conference calls;

determining in the CACS the maximum conference size assigned to the linked unique number;

selecting in the CACS available ports on one of said plurality of bridge servers wherein said one server has enough available ports to support the maximum size of the conference call;

obtaining a translation number for one of the selected bridge servers in the CACS;

delivering the obtained translation number to the SS7 from the CACS; and setting up the on-demand conference call through the PSTN on the one selected bridge server under control of the CACS when the subscriber dials the assigned unique number into the PSTN.

13. The on-demand conferencing method of claim 12 wherein the step of selecting further selects available ports on said one bridge of said plurality of bridge servers based on load control and routing costs.

14. The on-demand conferencing method of claim 12 wherein the step of selecting further selects available ports on said one bridge of said plurality of bridge servers based upon failed hardware resources in a bridge.

15. The on-demand conferencing method of claim 12 further comprising the step of changing the status of the se t up on-demand conference call when the subscriber or any one of the plurality of participants input a status change.

16. The on-demand conferencing method of claim 15 wherein the changing status step occurs when the on-demand user inputs at least one of the following: (a) DTMF signals, (b) World Wide Web commands, and (c) E-mail to the CACS.

17. A method for connecting a subscriber and a participant in an on-demand conference call in a telecommunications system, said telecommunications system having a conference allocation and control system (CACS) controlling ports on a conferencing bridge, each of said plurality of bridge servers having a sufficient number of ports to support a plurality of on-demand conference calls, the CACS and the conferencing bridge located externally from said Public Switched Telephone Network (PSTN), said method comprising:

assigning a unique on-demand conference number to the subscriber; and storing the assigned unique number, the subscriber selecting a PIN for the conference call and delivering the assigned unique number and the PIN to the plurality of participants, the CACS setting up the conference call on the ports of the conferencing bridge when the subscriber dials the assigned unique number in the telecommunications system, the subscriber entering the PIN to the CACS in response to the step of setting up, the CACS adding a participant to the set-up conference call on a port in the conferencing bridge when one of the plurality of participants dials the assigned unique number in the telecommunications system and enters the PIN to the CACS.

18. The method of claim 17 wherein the step of assigning further includes assigning a passcode to the subscriber and wherein the step of setting up further comprises the steps:

prompting the subscriber for a passcode;

entering the passcode by the subscriber, verifying that the entered passcode corresponds to the assigned passcode, receiving a PIN from the subscriber in response to the step of verification beginning the conference call in response to the step of receiving the PIN.

19. The method of claim 18 wherein the step of adding a participant further comprises:

prompting the one participant to enter a PIN;

entering the PIN by the one participant;

verifying that the entered PIN corresponds to the PIN received from the subscriber;

placing the one participant into the conference call.

20. The method of claim 19 further comprising the step of:

placing the one participant on hold until the conference call begins.

21. The method of claim 18 further comprising the step of:

changing the assigned passcode by the subscriber in response to the step of verifying the passcode.

22. The method of claim 18 further comprising the steps of:

recording a greeting from the subscriber in response to the step of verifying the passcode;

playing the recorded greeting to the added participant.

23. A method for connecting a subscriber and a participant in an on-demand conference call in a telecommunications system, said telecommunications system having a conference allocation and control system (CACS) controlling a plurality of ports on a plurality of conferencing bridges, each of said plurality of bridge servers having a sufficient number of ports to support a plurality of on-demand conference calls, the CACS and the conferencing bridge located externally from said Public Switched Telephone Network (PSTN), said method comprising:

assigning a unique on-demand conference number and a maximum conference size to the subscriber; and storing the assigned unique number and maximum conference size, the subscriber selecting a PIN for the conference call and delivering the assigned unique number and the PIN to the plurality of participants, the CACS selecting ports on one conferencing bridge from said plurality of conferencing bridges wherein said one conferencing bridge has enough capacity to handle the maximum conference size, the CACS setting up the conference call on the selected ports of the one conferencing bridge when the subscriber dials the assigned unique number in the telecommunications system and enters the PIN to the CACS, the CACS adding a participant to the set-up conference call on the selected ports in the one conferencing bridge when one of the plurality of participants dials the assigned unique number in the telecommunications system and enters the PIN to the CACS.

24. An on-demand conferencing system for making a conference call between a subscriber and a plurality of participants, said on-demand conferencing system comprising:

a database;

a unique number, a single passcode, and a maximum conference size assigned to said subscriber, said unique number, single passcode and maximum conference size stored in said database;

a Public Switched Telephone Network (PSTN), said PSTN having service points for said subscriber, said service points receiving said unique number from said subscriber or from said plurality of participants for routing said unique number;

a conference allocation and control system (CACS);

an SS7 receiving the routed unique number from said service points for delivering the routed unique number to said CACS; and a plurality of bridge servers having a plurality of ports connected to said CACS, said CACS and said plurality of bridge servers located externally from said PSTN, each of said plurality of bridge servers having a sufficient number of ports to support a plurality of on-demand conference calls, said CACS accessing said database based upon said delivered unique number for obtaining said maximum conference size, for selecting available ports on said one bridge server from said plurality of bridge servers, said one bridge server having enough available ports for handling said maximum size conference, said CACS returning to said SS7 routing information identifying the selected ports at the at least one bridge server, said SS7 delivering said routing information to said PSTN, said PSTN linking said subscriber to said selected ports of said one bridge server, said CACS setting up said conference call in said selected ports of said one bridge server of said plurality of bridge servers when said subscriber delivers said single passcode to said CACS over said link, said CACS adding said plurality of participants to said conference call.

25. The on-demand conferencing system of claim 24 wherein said CACS has a bridge status memory file for said plurality of bridges, said bridge status memory file containing the identity of each bridge and the number and status of ports available for each said bridge.

26. The on-demand conferencing system of claim 24 wherein the number of ports available for each bridge in the bridge status memory file is updated when said CACS sets up said conference call in said available ports of said one bridge server.

27. The on-demand conferencing system of claim 25 wherein said bridge status memory file is updated when an additional bridge server is added to said plurality of bridge servers.

28. The on-demand conferencing system of claim 25 wherein said bridge status memory file is updated when additional ports are added to any one of said plurality of bridge servers.

29. The on-demand conferencing system of claim 25 wherein said bridge status memory file is updated whenever any ports in any of said plurality of bridge servers fails.

* * * * *